Oct. 28, 1952     E. W. GARDINOR ET AL     2,615,333
RECORD CARD VERIFYING MACHINE

Filed May 20, 1950                                  9 Sheets-Sheet 1

INVENTORS
ELLIOTT W. GARDINOR
RAYMOND E. CHENEY
LORIN T. BLEUER
BY William Lang
ATTORNEY INVENTORS
ELLIOTT W. GARDINOR
RAYMOND E. CHENEY
LORIN T. BLEUER
BY William Lang
ATTORNEY Oct. 28, 1952  E. W. GARDINOR ET AL  2,615,333
RECORD CARD VERIFYING MACHINE Filed May 20, 1950  9 Sheets-Sheet 4

INVENTORS
ELLIOTT W. GARDINOR
RAYMOND E. CHENEY
LORIN T. BLEUER
BY William Lang
ATTORNEY INVENTORS
ELLIOTT W. GARDINOR
RAYMOND E. CHENEY
LORIN T. BLEUER
BY *William Lang*
ATTORNEY INVENTORS
ELLIOTT W. GARDINOR
RAYMOND E. CHENEY
LORIN T. BLEUER
BY William Lang
ATTORNEY Oct. 28, 1952  E. W. GARDINOR ET AL  2,615,333
RECORD CARD VERIFYING MACHINE
Filed May 20, 1950  9 Sheets-Sheet 7

INVENTORS
ELLIOTT W. GARDINOR
RAYMOND E. CHENEY
LORIN T. BLEUER
BY *William Lang*
ATTORNEY

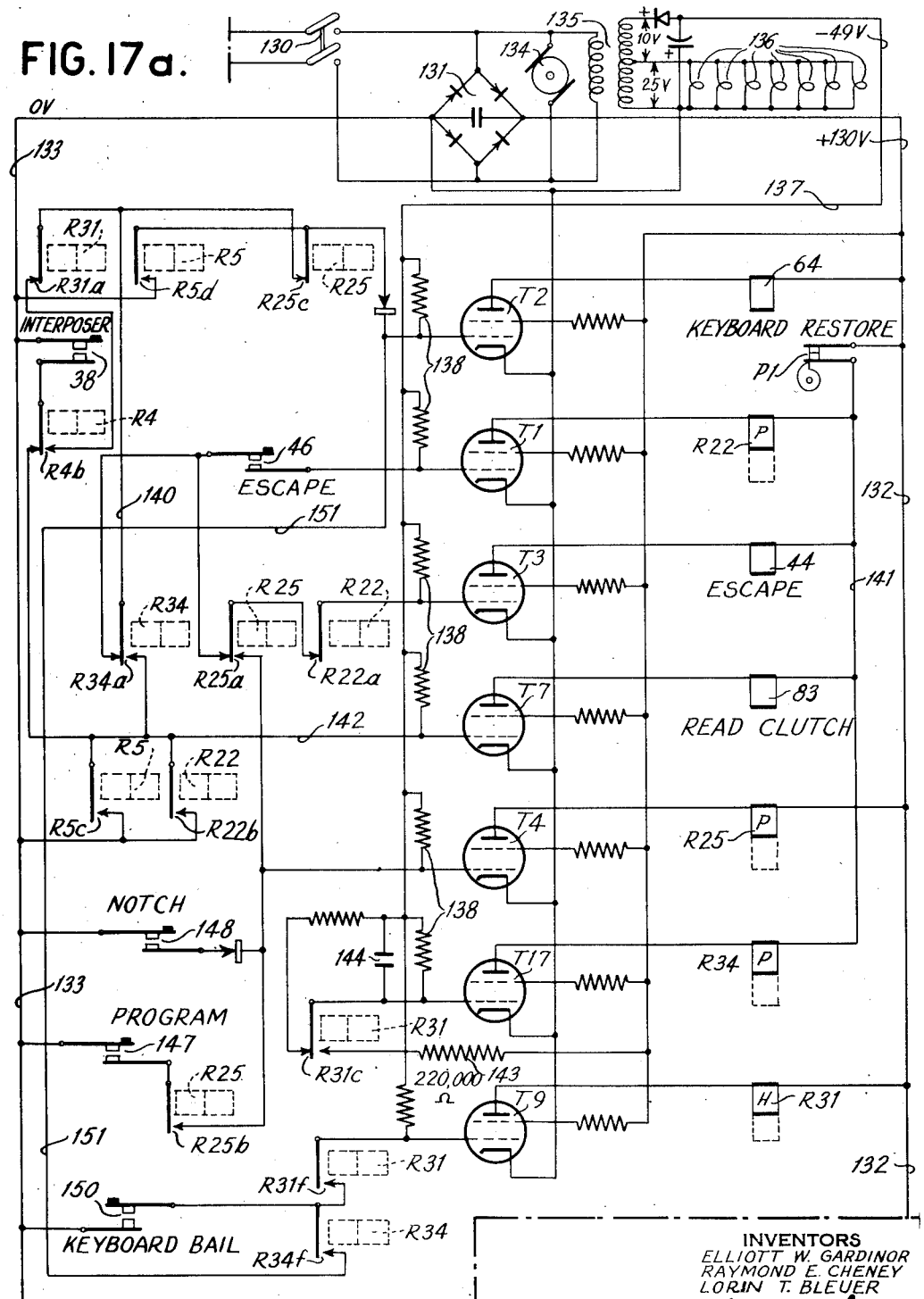

Patented Oct. 28, 1952

2,615,333

UNITED STATES PATENT OFFICE 2,615,333

RECORD CARD VERIFYING MACHINE

Elliott W. Gardinor, Conklin, Raymond E. Cheney, Endicott, and Lorin T. Bleuer, Vestal, N. Y., assignors to International Business Machines Corporation, New York, N. Y., a corporation of New York Application May 20, 1950, Serial No. 163,182

14 Claims. (Cl. 73—156)

This invention relates to verifying machines employed in the verification of perforated record cards and more particularly to improvements in devices of this class which are automatic in operation and electrically controlled.

The principal object of the invention is to provide a more efficient and a more simple mechanism for comparing perforations in a column of a record card with a keyboard setting to determine the relationship between the two.

A more specific object of the invention is to provide a simplified electrical circuit arrangement in a verifying machine of this type. Provision is made for indicating an error by the illumination of a signal lamp and operation of an audible signal, accompanied by retention of the column in error at the card sensing position. Further provision is made to enable the operator to reverify the column in error and, if upon a second test the column is found to be correctly punched, the card will be freed to advance to the next column.

A particular feature of the present invention provides for the locking down of any key beyond that related to a column in error, for a brief period of time, where such key operation results from "overkeying" due to rapid operation. Provision is made to nullify the effect of such "overkeying" and to automatically restore the locked key, so that a considered selection may be made of the key to be depressed after the error detection.

In practice, an operator "keys" at a fairly rapid rate so that, where a "wrong" key is depressed, several additional keys will have been operated as well, before the operator reacts to the fact that an error has been detected. This "overkeying" is of no consequence as the occurrence of the "error" will have immediately disabled the effectiveness of the additional keying. In prior devices, it was necessary to operate a special key and then reverify the column in error, but because of such "overkeying" the operator had difficulty in identifying which column was to be reverified without recourse to the actual columnar position of the card in the machine, with resultant disruption of rhythmic keying and loss of time.

By locking down the next key operated after an error detection, the operator is better able to recall the column in error and by providing this key locking for a brief interval in the order of about two seconds, the previous special key operation can be eliminated, so that upon detection of an error the operator may rekey after a slight delay without appreciable change of rhythm and will in addition by observation of the locked key know the columnar location of the error.

A further object of the invention is to provide improved notching mechanism for notching the margin of the card in columns containing error and also for providing a special notch in a different margin, if no errors have been detected, so that the latter notch indicates a card that has been verified and found to be correct.

A still further object of the invention is to provide a program controlled field skipping mechanism which functions to skip the remander of a field on the card, if an error is found in any column of such field, which field comprises a plurality of adjacent columns assigned to record some particular item of information. When an error occurs in the punching of any column of the field, the practice is to prepare a new card by automatically reproducing all the data on the card except for the field in error, and such field is then key punched column by column from the original source data. Since such key punching of the entire field in error is to be repeated, time is saved by not verifying beyond the point at which a first error in a field is detected. Accordingly, when verifying, the remainder of the field is skipped.

A specific object of the invention is to provide a programming device in the form of a perforated card which may be configured to bring about the automatic skipping, upon error detection, of any selected field or fields of the record card.

Other objects of the invention will be pointed out in the following description and claims and illustrated in the accompanying drawings, which disclose, by way of example, the principle of the invention and the best mode, which has been contemplated, of applying that principle.

In the drawings:

Fig. 14 is a view of a program card.

Fig. 15 is a view of a punched card to be verified.

Fig. 16 is a timing diagram of certain cam operated contacts.

Figure 17B:
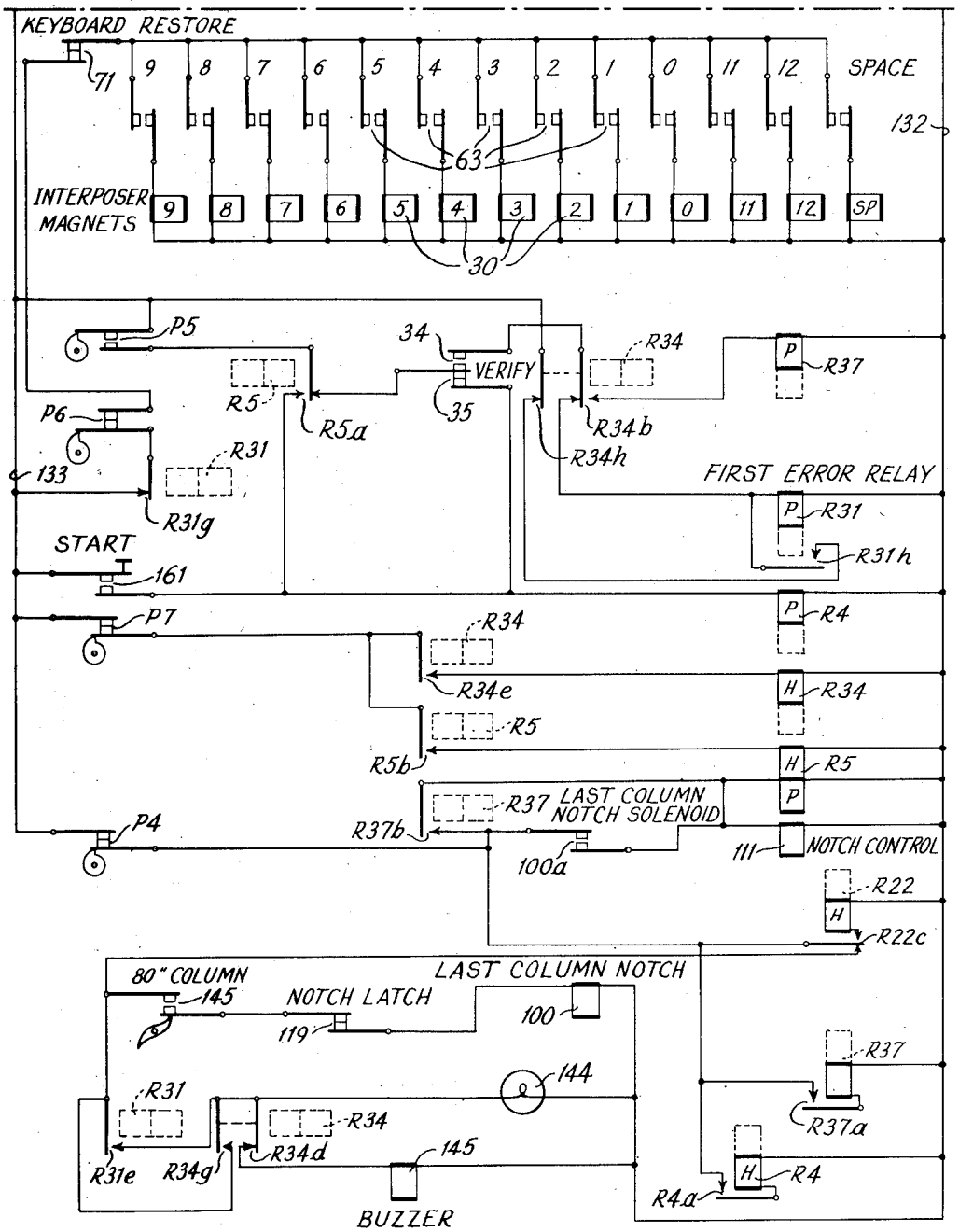

Figs. 17a and 17b placed one above the other constitute a wiring diagram of the electric circuits of the machine.

The several separate mechanical components of the apparatus will first be explained, after which the operation of the machine in the handling of a specific example will be set forth in connection with the circuit diagram, at which time the manner of coordination of the several mechanical units will be pointed out.

*The record card*

Referring to Fig. 15, there is shown a typical record card provided with 80 columns of perforation receiving positions, each column of which is provided with 12 testing positions. The columns may be grouped into several fields as represented by vertical dividing lines. The record card is designated as 10 in Figs. 1, 3 and 15, and in order to verify the perforations this card is placed with its lower margin in position between the feed roller 11 and spring pressed pressure roller 12, with column 1 thereof placed one column to the right of the common center line between the two rollers.

Automatic mechanism may be provided for advancing the card from a supply hopper to such position. Such card introducing mechanism forms no part of the present invention, and accordingly it is assumed that the card may be inserted manually into the position stated. Automatic mechanism for feeding the card to a position between rollers, such as 11 and 12, is shown and claimed in copending application of E. W. Gardinor et al., Serial No. 103,224, filed July 6, 1949.

*The comparing mechanism*

In line with the common center line of the rollers is a row of sensing blades 13 (Figs. 3 and 4), twelve in number, each of which is provided with an opening through which it is hooked to a bell crank 14 pivoted at 15 to a slide 16 suitably guided for vertical reciprocation in a channel plate 17 and biased upwardly by a spring 18.

A U-shaped leaf spring 19 biases bell crank 14 in a clockwise direction, and the unbalanced weight thereof also serves to hold it in the position shown. A bail 20 normally engages a shoulder on slide 16 to hold it in the position shown in Fig. 3. This bail is pivoted about a rod 21 and, when rocked counterclockwise to the position of Fig. 12, will enable slide 16 to rise under the influence of its spring 18 carrying with it the bell crank 14 and sensing blade 13. The upper end of the blade normally lies just below the lower surface of the card and if, when elevated, there is no perforation in line therewith, it will strike the under surface of the card and be restrained thereby against further upward movement.

Figure 12:
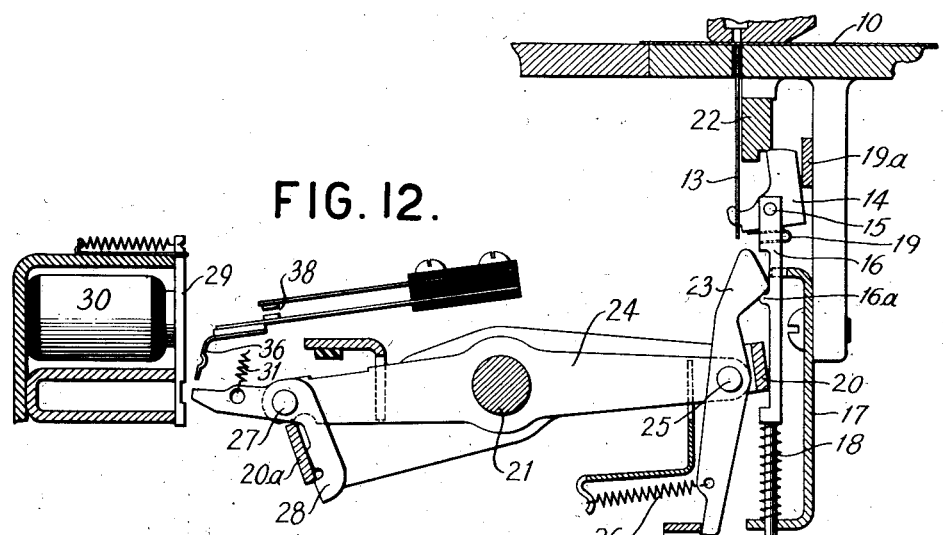
Fig. 12 is a position view of the parts of the comparing device of Fig. 3.

Accordingly, continued upward movement of slide 16 will cause bell crank 14 to rock to the position shown in Fig. 12 where the vertical arm of the bell crank has rocked beneath a stationary cross bar 22, so that further upward movement of the slide is interrupted and the continued pressure of spring 18 is transmitted against bar 22. The inertia of bell crank 14 will cause it to "overthrow," that is, rock in a counterclockwise direction to an extent that will retract the blade 13 from contact with the under surface of the card and pressure of spring 18 will hold the bell crank in such overthrown position by pressing the bell crank tightly against bar 22 in its overthrown position. This construction avoids the possibility of creating an indentation in the card such as has been occasioned by earlier forms of pin sensing devices, where the load of the actuating spring has been transmitted directly against the card.

Figure 3:
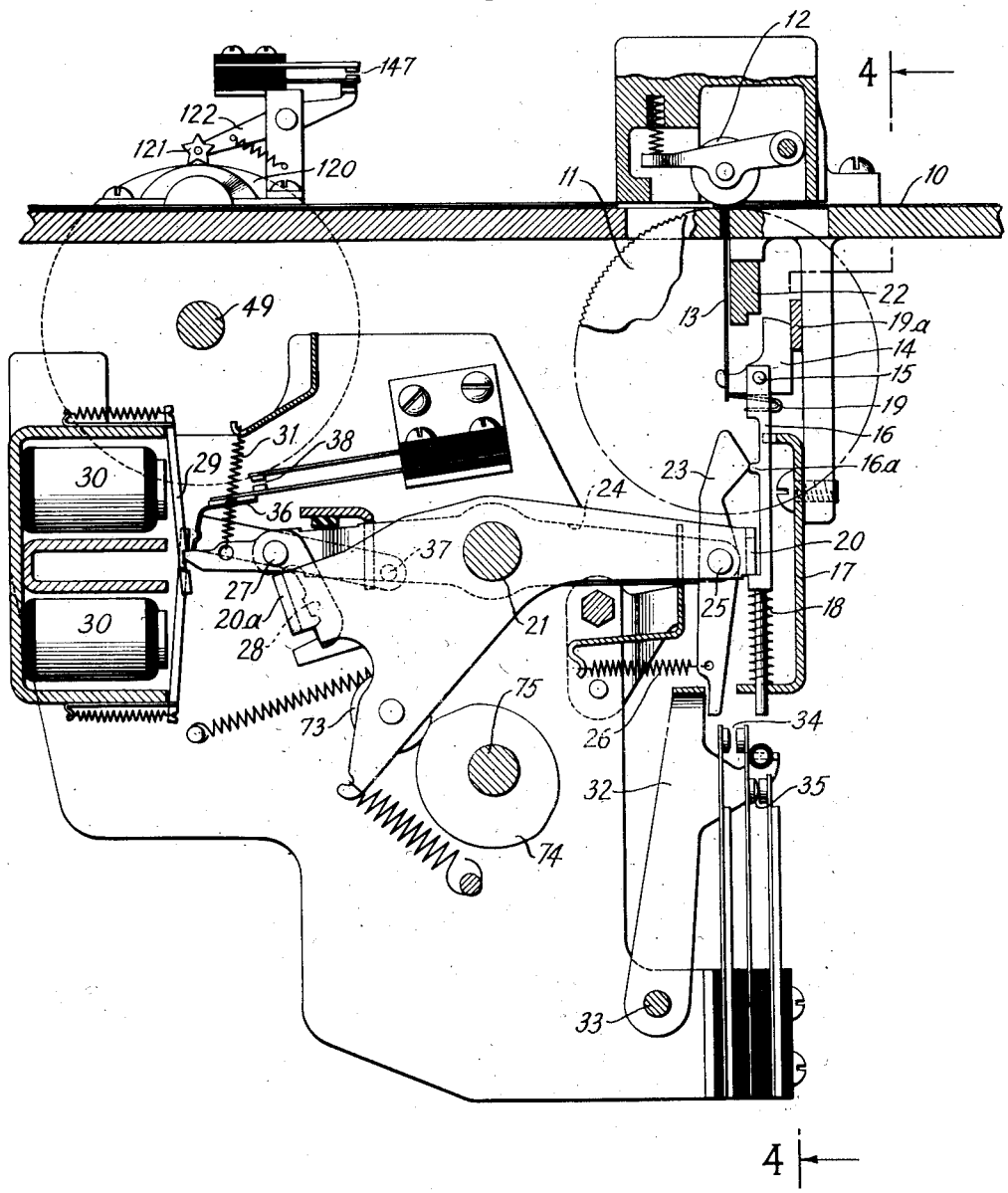
Fig. 3 is a sectional elevation taken on lines 3—3 of Fig. 1 showing the sensing blade and key controlled comparing mechanism.

The spring 19 is not essential, as due to the fact that the greater part of the mass of bell crank lever 14 lies to the right of pin 15, the lever is constantly biased clockwise as viewed in Fig. 3, and as the blade 16 rises centrifugal force will increase this bias to hold the lever against a guide rail 19a.

The foregoing sensing mechanism is shown and claimed in the copending application of Raymond E. Cheney, Serial No. 163,061, filed May 19, 1950.

Referring now to Fig. 3, there is provided a finger 23 for each slide 16. Each finger 23 is pivoted to a lever 24 at 25 and is biased in a clockwise direction by a spring 26, so that the upper end of the finger is pressed against a projection 16a of its related slide 16. At its opposite or left hand end, each lever 24 has pivoted thereto at 27 a spring urged hook 28 which, when the parts are in the normal position of Fig. 3, is engaged and held by the armature 29 of a so-called interposer magnet 30. Each magnet 30 is energized under control of a verifying key through devices and circuits to be explained hereinafter.

Upon energization of any magnet 30, its armature 29 is attracted to release its related hook 28 which, under control of its spring 31 will rock clockwise to the position of Fig. 12, so that the hook will engage under the cross bar of bail 20a and, upon rocking of bails 20, 20a, the related lever 24 will rock counterclockwise to the position of Fig. 12. In doing so, the finger 23 will be elevated from the position of Fig. 3 to that of Fig. 12, which shows the positions of the parts where finger 23 has been elevated in response to operation of a particular key, but the sensing blade 13 related to the perforation position corresponding to that key has not been elevated, so that finger 23 rides upwardly from the projection 16a on the slide with an accompanying clockwise movement.

Extending across the lower edges of all the fingers 23 is a light bail 32 pivoted at 33 and biased clockwise by the center blade of a pair of contacts 34, 35 which are normally open and closed, respectively. When any one of the fingers 23 rocks clockwise, it will shift bail 32 to the position of Fig. 12 to reverse the condition of the contacts 34, 35.

Where the blade 13 finds a perforation and permits slide 16 to rise, such upward movement is coextensive with the upward movement of the corresponding finger 23, so that the finger and slide maintain their relative relationship with the finger resting against projection 16a, and rotary movement of the finger is thereby prevented.

Where a perforation is encountered, resulting in upward movement of slide 16 but the corresponding lever 23 has not been unlatched for movement, the finger 23 will remain in the position of Fig. 3 so that projection 16a moves up, allowing finger 23 to rock thereunder and actuate the contact bail 32.

Briefly, then, the comparing operation may be summarized by stating that, where a blade 13 reads a perforation without accompanying elevation of corresponding finger 23, the checking or verifying bail 32 is rocked and also, where finger 23 is elevated without accompanying elevation of the corresponding blade 13, there is likewise a rocking of the bail to indicate non-conformity between the card position sensed and the verifying key depressed. Where both are elevated, they maintain their relative relationship and the bail 32 is not disturbed. Likewise, where there is no perforation in a position and the related key is not operated, the parts 16 and 32 remain substantially in the relative positions of Fig. 3 to also avoid operating the verifying bail.

*Interposer contacts.*—In Fig. 3, a bail 36 pivoted at 37 extends across the upper edges of the hooks 28 so that, if any one of them is tripped, the bail is rocked slightly clockwise to close a pair of interposer contacts 38.

Figure 11:
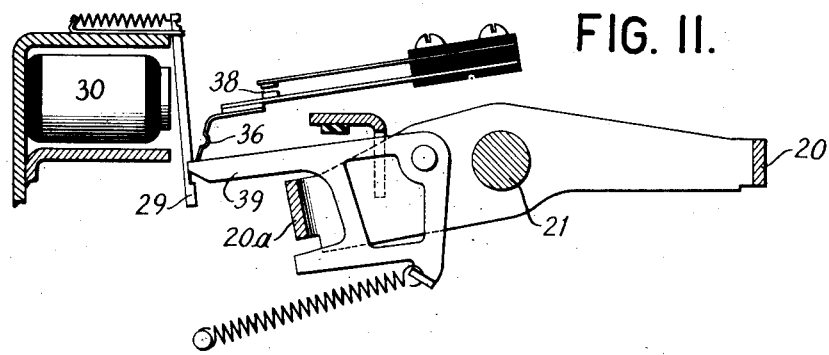
Fig. 11 is a detail of the space key controlled contact operating device.

*Space key.*—In Fig. 11 is shown the mechanism controlled by the magnet 30 related to the space key. When this key is operated, magnet 30 is energized and its armature 29 will release a spring pressed lever 39 pivoted on the bail 20, 20a so that, when this magnet is energized, the lever 39 is released for clockwise rotation to actuate bail 36 and close contacts 38.

Card advancing mechanism

Figure 1:
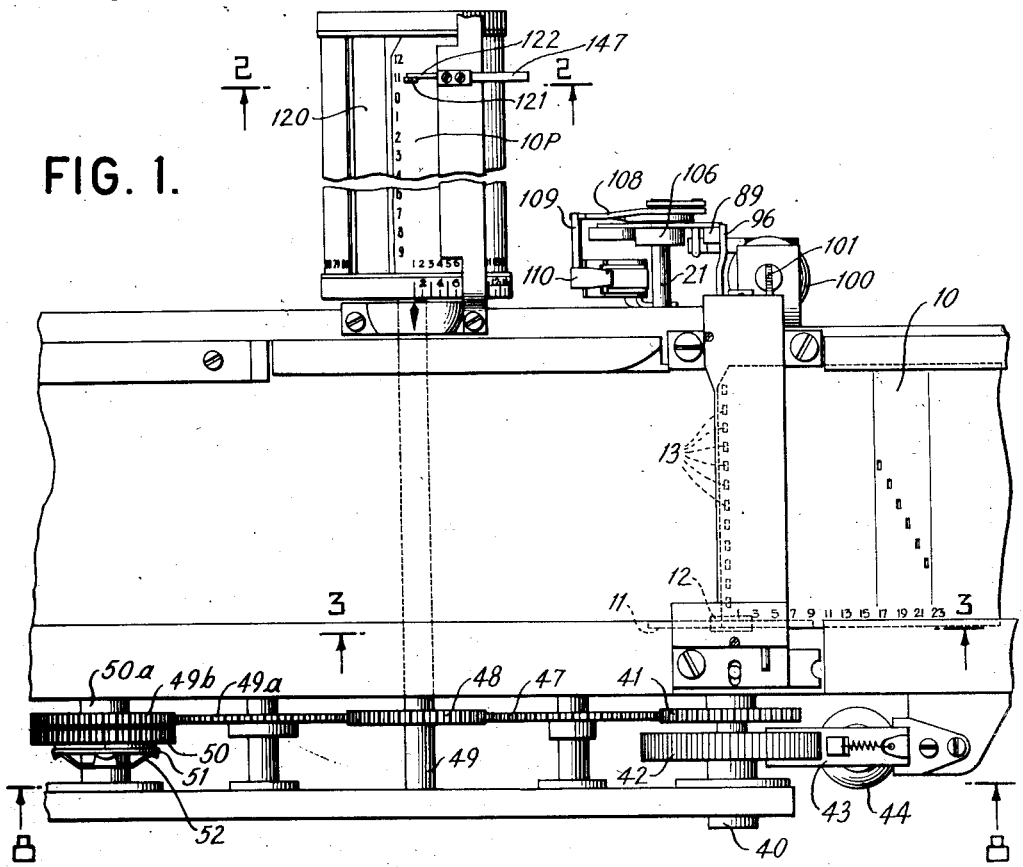
Fig. 1 is a plan elevation of the device showing a card to be verified in starting position.
Figure 4:
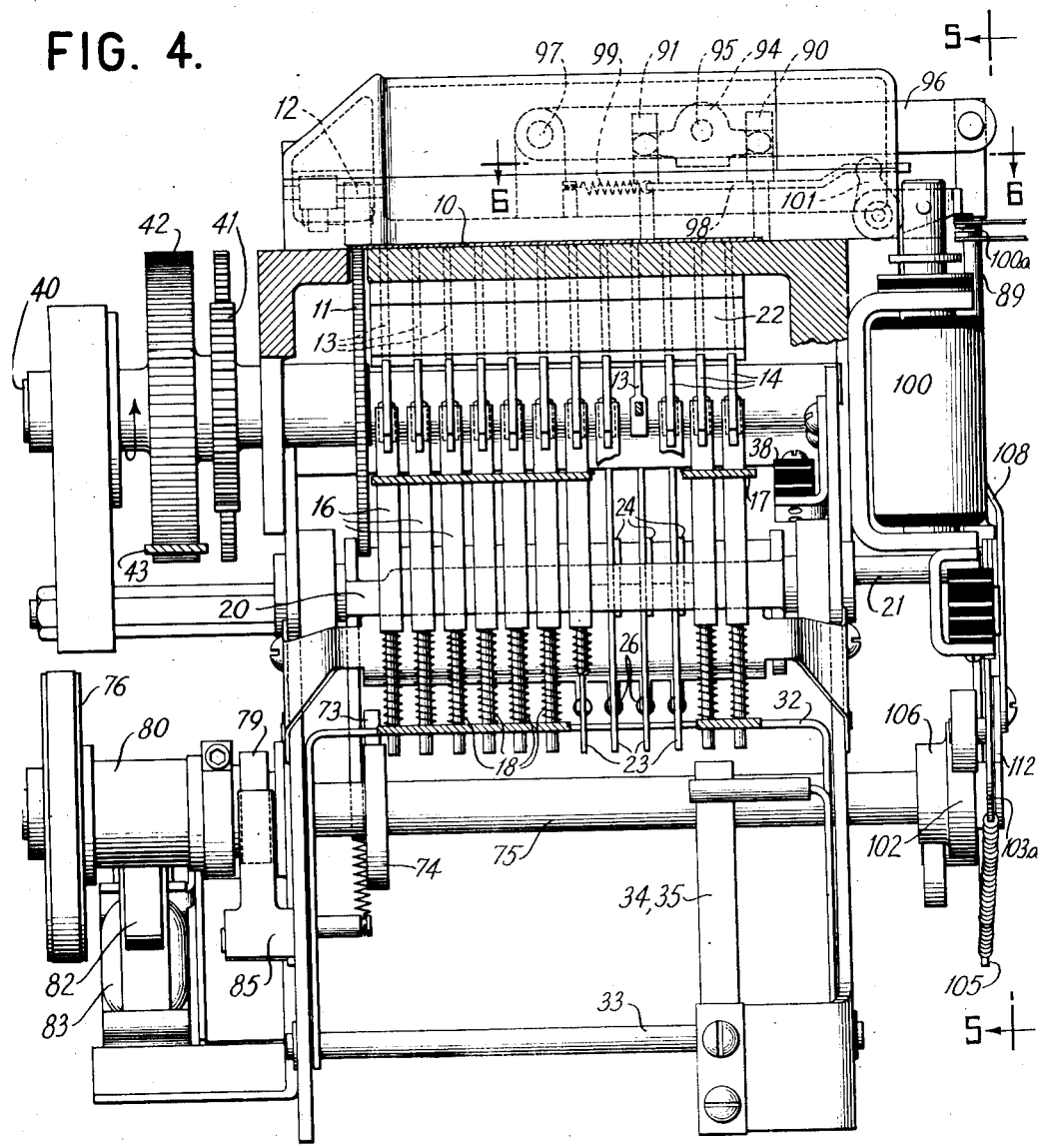
Fig. 4 is an end elevation taken on lines 4—4 of Fig. 3.
Figure 8:
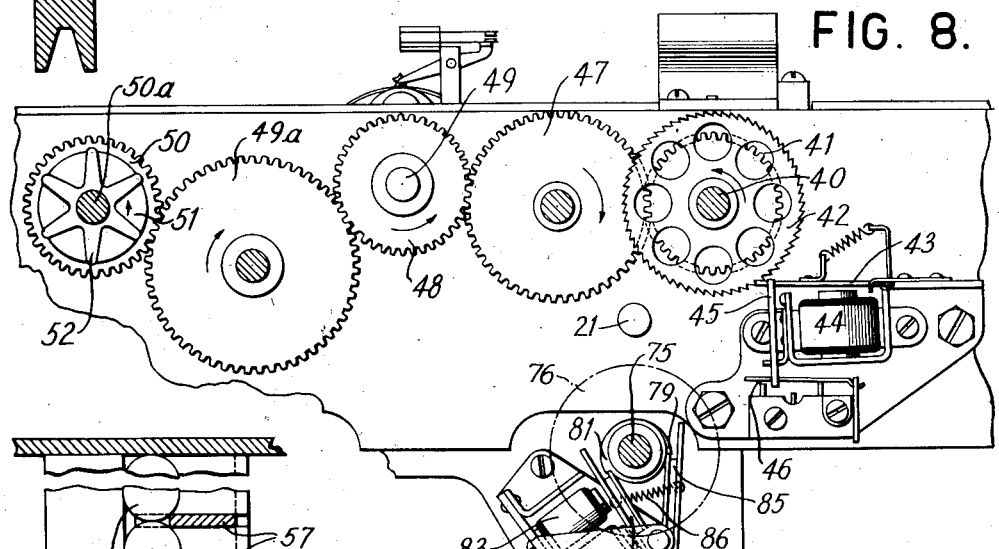
Fig. 8 is a section on lines 8—8 of Fig. 1 showing the friction drive and card escapement mechanism.

*Escapement.*—Referring to Figs. 1, 4 and 8, the card feed roller 11 which engages one edge of the card is secured to a shaft 40 which (Fig. 4) has secured thereto a gear 41 and a ratchet 42. The shaft 40 with gear 41 and ratchet 42 secured thereto is biased in a counterclockwise direction as viewed in Fig. 8 but is restrained by the armature 43 of magnet 44. Momentary energization of magnet 44 will release the ratchet for one step or tooth advance which corresponds to the columnar spacing of the card and will accordingly advance the card one column for each momentary energization of the magnet. The armature 43 of the magnet is connected through a rod 45 to a pair of contacts 46 whose purpose will be explained in connection with the circuit diagram.

*Friction drive.*—The mechanism for biasing the shaft 40 is the following. In Figs. 1 and 8 the gear 41 through an intermediate idler 47 has connection with a gear 48 secured to a shaft 49. Gear 48 has driving connection through an idler gear 49a with a gear 49b secured to a shaft 50a. On this shaft is freely mounted a gear 50 which may be constantly rotated from any suitable source (not shown). Also mounted on shaft 50a for rotation therewith but slidable thereon is a disk 51 urged toward gear 50 by a blade spring 52. Disks of friction material are disposed between plate 52 and gear 50 and between the gears 49b and 50, so that as gear 50 is constantly rotated, the frictional bias is imparted to gear 49b and through gears 49a, 48 and 47 transmitted to gear 41 and ratchet 42.

The keyboard

Figure 7:
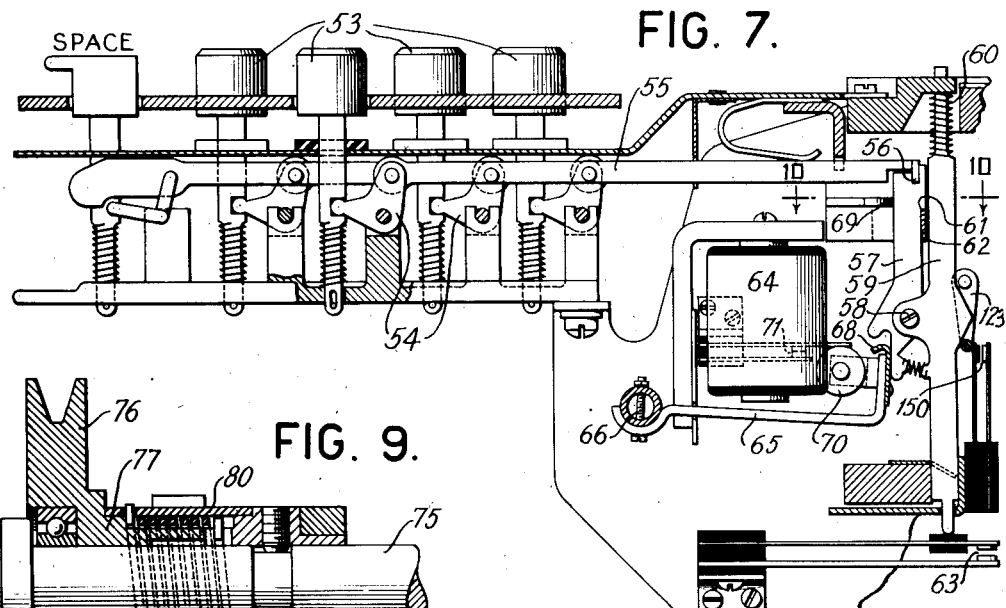
Fig. 7 is a sectional view of the keyboard mechanism showing the essential elements thereof.

The keyboard through which the interposer magnets 30 are energized is shown in Fig. 7, where only the essential elements are disclosed, comprising a plurality of keys 53, each of which is mounted for vertical reciprocation and through a bell crank 54 will draw a slide 55 toward the left. The right hand end of the slide is provided with a hooked end extending into a notch 56 in a latch plate 57 which is pivoted at 58 on a slide 59. This slide is normally biased downwardly by a spring 60 but is held in upper position through the engagement of edge 61 of latch 57 with a stationary cross bar 62. The normal position of the parts is shown in Fig. 7, and upon depression of one of the keys 53 its related slide 55 will be drawn toward the left carrying the upper end of the related latch 57 therewith (see Fig. 13). This unhooks the latch from bar 62 and spring 60 will thereupon force its slide 59 downwardly to close a related pair of contacts 63. The space key 53S has a similar set of connections to operate a related slide 59 and contacts 63.

The contacts 63, as will be explained in connection with the circuit diagram, complete a circuit through a related interposer magnet 30.

For restoring the slides 59, there is provided restoring magnet 64 which, when energized, will rock its armature 65 pivoted at 66 to force a bent plate 68 upwardly against an arm of latch 57 to elevate the latch and its related slide 59, at the same time effecting a clockwise rocking of the latch to cause it to reengage the stationary bar 62. Upon deenergization of the magnet, the latch 57 will drop down on the bar and slide 55 will hook over the latch, if the key has been released.

Figure 10:
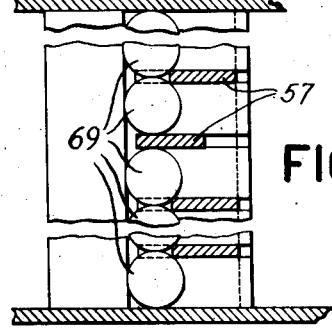
Fig. 10 is a detail of the key latch interlock device taken on lines 10—10 of Fig. 7.
Figure 13:
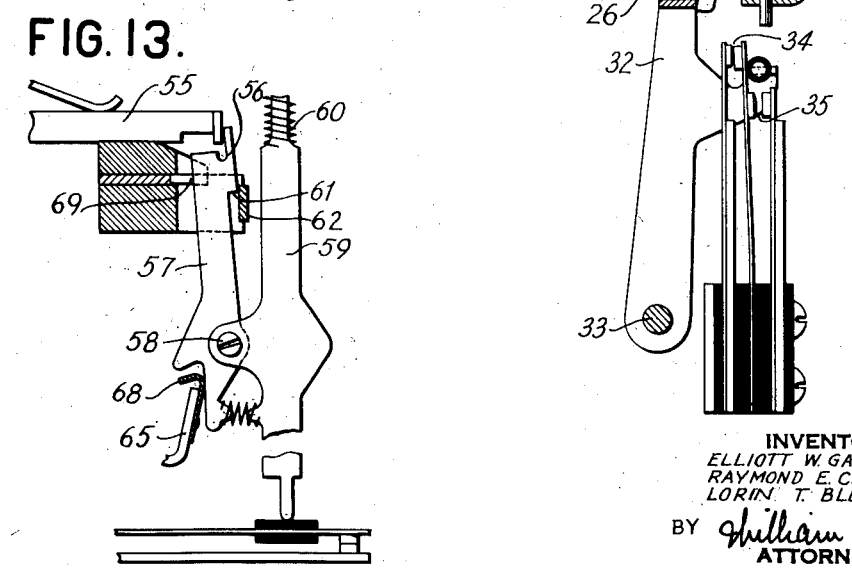
Fig. 13 is a position view of the parts of the bey bail mechanism of Fig. 7.

Lying adjacent the left hand edges of latches 57 (Figs. 7 and 10) is a row of interlock disks 69 spaced so that only one latch may be in rocked position at any one time and, where a latch is so rocked and dropped as in Fig. 13, it will be noted that as long as the latch remains down, no other key can be operated and the key related to the tripped latch is also locked down, because the right hand end of its slide 55 is held against movement toward the right by the upstanding extremity of the latch.

The armature 65 of magnet 64 is provided with an extension 70 (Fig. 7) through which a pair of contacts 71 are opened whenever the magnet is energized.

Verifying blade operating mechanism

Figure 9:
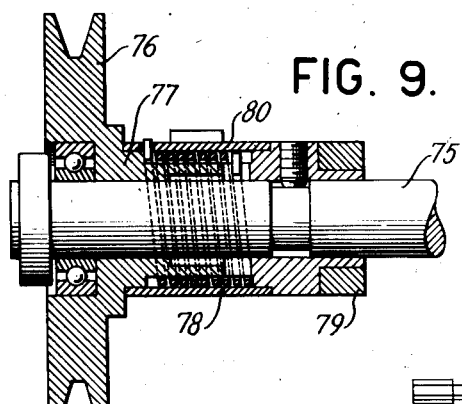
Fig. 9 is a detail of a one-revolution clutch for the card comparing mechanism.

Referring to Figs. 3 and 4, the bail 20, 20a is provided with a cam follower roller 73 which cooperates with a cam 74 on shaft 75 to rock the bails. This shaft is driven through a well known form of coil spring clutch shown in Fig. 9. On the shaft there is freely mounted a pulley 76 which is constantly driven from any suitable source of power. This pulley has a hub 77 extending within the convolutions of a coil spring 78. Secured to shaft 75 is a stop cam 79 (see also Fig. 8) and extending between pulley 76 and the stop cam is the spring 78. One end of the spring is fastened to the stop cam and the other end is fastened to a sleeve 80. The sleeve is provided with a stop 81 which engages armature 82 of a magnet 83 while cam 79 has a stopping edge engaging against a pivoted lever 85, which is urged toward the armature 82 by a spring 86.

The parts just described constitute a well known form of one revolution clutch and, with the parts in normal position with both stops 81 and 79 engaging their respective levers, the spring 78 is held in slightly open position, so that the hub of pulley 76 may rotate freely within the spring. Upon energization of magnet 83, armature 82 releases stop 81 whereupon spring 78 will tend to close, rocking sleeve 80 and will grip the hub of the pulley, so that the spring will be driven thereby, and through its connection with the stop cam 79 will drive shaft 75. If magnet 83 is deenergized before completion of a revolution, the stop 81 will reengage the armature 82 to open the spring. The driven parts will overthrow slightly, so that cam 79 will reengage lever 85 preventing reclosure of the coil spring.

Thus, when shaft 75 is given one revolution, bails 20, 20a will rock and at such time the elevation of sensing blades 13 will occur. Secured to shaft 75 are several contact operating cams diagrammatically shown on the circuit diagram and their timing is shown in Fig. 16.

Card notching mechanism

Figure 6:
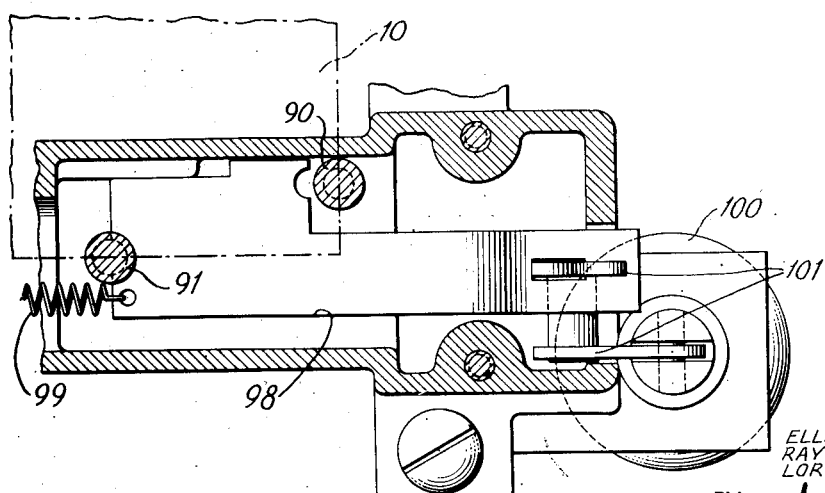
Fig. 6 is a detail view of the notching-punch selecting plate taken on lines 6—6 of Fig. 4.

Referring to Figs. 4 and 6, a punch 90 is located in line with the sensing blades 13, and a second punch 91 is located adjacent thereto so that, when the last or 80th column of the record card is in line with the sensing blades, punch 90 will be in line with and overlap the upper edge of the card, while punch 91 will overlap the right hand edge of the card between the 0 and 1 positions thereof. The punches are mounted for reciprocation above the card and, if either one is depressed, it will cut a circular notch 92 or 93 in the edge (see Fig. 15). The two punches are interconnected by means of an offset lever 94 pivoted at 95 to a lever 96 which may be rocked about a fixed pivot 97 by lowering of a link 89 connected to one end thereof.

The interposer plate 98 configured as shown in Fig. 6 is normally held in the position shown by a spring 99, so that an edge of the plate is held under a shouldered upper portion of punch 91. With the parts in such position, downward movement of link 89 will rock arm 96 clockwise as viewed in Fig. 4, moving pin 95 downward. Since punch 91 is blocked by interposer plate 98 against accompanying movement, lever 94 will be given a clockwise movement to depress punch 90 against the card.

Solenoid 100 when energized will shift interposer plate 98 toward the right through a bell crank lever 101. This movement will release punch 91 and will cause another edge of the plate to slide under the upper shouldered portion of punch 90. With solenoid 100 energized to hold the plate in shifted position, the downward movement of link 89 will rock lever 96, but since punch 90 is now locked against movement the arm 94 will rock slightly counterclockwise as its pivot pin 95 descends to operate the punch 91.

The punch 90 may be operated with any column of the card in sensing position, while punch 91 will only be operated with the card in so-called last column position, provided that the error punch 90 has not been operated during the verifying operations.

Figure 5:
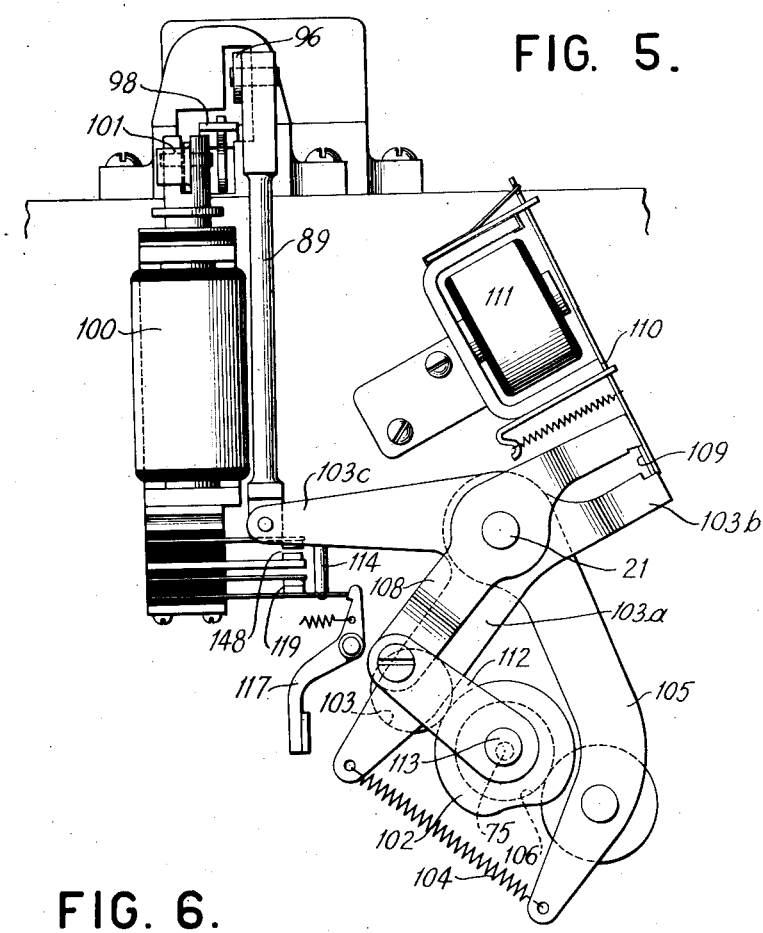
Fig. 5 is a view looking in the direction of lines 5—5 of Fig. 4 showing the notching operating mechanism.

The mechanism for reciprocating link 89 is shown in Fig. 5, where shaft 75 carries a cam 102 thereon, which cooperates with a follower roller 103 of a lever having three arms designated 103a, 103b, 103c. The last of these is connected to the link 89. The lever 103a is normally urged in a counterclockwise direction through spring 104 extending to a follower arm 105 whose roller rides on a concentric disk 106. Rod 21 upon which lever 103a is pivoted has also pivoted thereto a lever 108 between which an arm 103b is a block 109 carried by the armature 110 of a notch controlling magnet 111. The arm 108 is normally held in the position shown through a link connection 112 with an eccentric 113 on shaft 75. With this arrangement, the force of spring 104 against arms 103b and 103a is transmitted through the block 109 against arm 108, so that the load thereof is not borne by the relatively light armature 110.

As long as magnet 111 remains deenergized, the parts remain in substantially the position shown and link 89 is not operated. Upon energization of the magnet, block 109 is rocked out of position between arms 103b and 108, so that the former may follow the contour of cam 102 and operate link 89.

When it is operated, the lower edge of arm 103c engages a post 114 to cause opening of a pair of contacts 119. A spring pressed latch 117 will thereupon engage and hold the contacts in open position until manually released.

Located beneath link 89 (Fig. 5) is a pair of contacts 148 which close when the link descends and open again when it rises.

The bell crank 101 (Fig. 4) when operated closes a pair of contacts 100a when solenoid 100 is energized.

Program card

Figure 2:
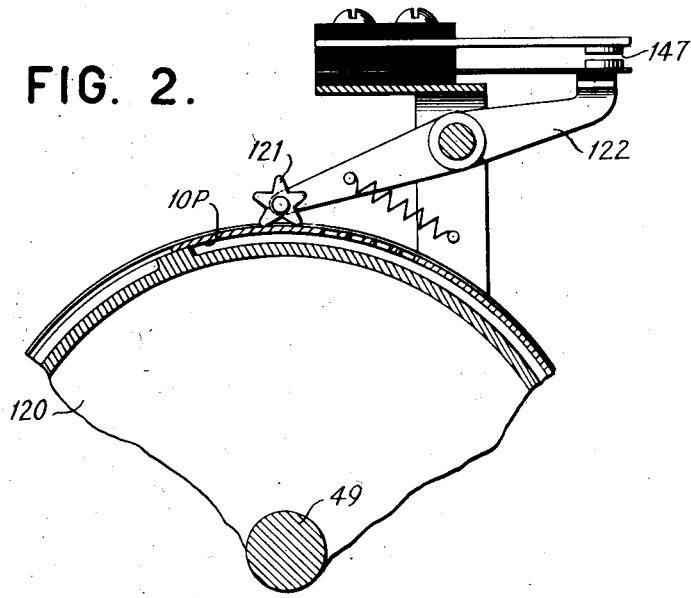
Fig. 2 is a detail section taken on lines 2—2 of Fig. 1 showing the program card reading mechanism.

In Figs. 1 and 2, the program card 10P is secured to the periphery of a drum 120 secured to shaft 49 which is geared to the card feed roller 11 and, therefore, advances step by step therewith. Riding on the surface of the card in line with the "11 hole" punch positions is a star wheel 121 pivoted on a lever 122. When a hole arrives at the wheel, the nearest tooth rolls into the hole, lowering the pivot of the wheel and enabling lever 122 to rock counterclockwise as viewed in Fig. 2 under the tension of the lower blade of a pair of contacts 147. The contacts accordingly close and, where there is a succession of holes, the wheel 121 will roll from one to the other without shifting the lever 122, so that the contacts 147 will remain closed for the duration of such succession of holes.

The relationship between cards 10 and 10P is such that wheel 121 senses a card column of card 10P one step or column before the corresponding column of card 10 arrives at its sensing blade 13. Thus, if for example there is an 11 hole in column 1 of card 10P, a tooth of wheel 212 will have rocked into such hole when column 1 of card 10 is one step away from the row of blades 13.

In Fig. 7, a bail 123 is arranged to be rocked by a cam surface on each slide 59 to close a pair of contacts 150 whenever a slide is lowered and to remain closed until the slide is restored upwardly.

Circuit diagram

Assume that a record card 10 perforated as shown in Fig. 15 is to be verified. The card is placed face up between the feed roller 11 and pressure roller 12 as indicated in Figs. 1 and 3, so that column 1 is one columnar space to the right of the center line through the two rollers.

It may be mentioned at this point that the operation of advancing the card step by step under control of the verifier differs from the operation of previous machines, in that the normal starting position is with the column to be verified one space away from the sensing position and that, when a key is operated, the machine first goes through a stepping or spacing operation to bring the column of the card up to the sensing position. If the column is correct, the devices are conditioned to permit another spacing operation when the key for the next column is operated. In other words, the operation calls for a space operation before a sensing operation as distinguished from prior machines, where the sensing operation was followed by a space operation.

Referring to Fig. 17a, current is supplied from a suitable source through main line switch 130 to a full wave rectifier generally designated 131 from which a plus line carrying 130 volts extends, and is designated 132. The negative or zero voltage line is designated 133. The motor 134 is wired directly across the supply lines and is therefore in constant operation, when switch 130 is closed. The primary of a transformer 135 is also wired directly across the line, and its secondary winding serves to provide current for filaments 136 of the tubes employed in the circuits. From the transformer a tube bias line of −49 volts, designated 137, extends to the bias resistors 138 of the several tubes designated with the prefix T, such as T2, T1, T3, T7, T4, T17 and T9.

As a preliminary, a relay designated R4 (Fig. 17b) is energized through closure of key operated "start" contacts 161, which complete a circuit through the pickup winding of the relay from line 133 to line 132. This relay has a holding winding designated H, and upon its energization will close its contacts R4a to provide a holding circuit from line 132, the H winding of relay R4, contacts R4a and normally closed cam operated contacts P4 to line 133.

In the circuit diagram, the relays shown are generally of the two-winding type having a pickup winding which is designated P and a holding winding designated H. For simplicity in wiring arrangement, these windings are shown at different points in the circuit, but suitably designated for identification as P or H. The contacts operated by the relays are also shown non-adjacent thereto for simplicity of wiring arrangement, and to assist in identifying the contacts the relays are shown dotted adjacent to the contacts they control and the contacts themselves are identified by the same reference character as the relay followed by a lower case letter. Thus, a relay R4 controls contacts R4a, relay R37 controls contacts R37a, R37b, and so on.

From Fig. 15, it is noted that column 1 of the card 10 contains a perforation in the 4 position and, if the operator now depresses the 4 key 53 (Fig. 7), the related slide 59 is released and the corresponding contacts 63 will be closed, completing a circuit in Fig. 17b extending from line 133, through relay contacts R31g, cam contacts P6 to the normally closed keyboard restoring magnet contacts 71, the 4 contacts 63, to the 4 interposer magnet 30 and line 132. As explained in connection with the mechanical description, this will result in tripping of the related hook 28 (Fig. 12) for engagement with bail 20a. As also explained, tripping of any hook 28 will rock the interposer bail 36 and cause closure of interposer contacts 38.

These contacts (shown in Fig. 17a) will complete a circuit from line 133, through the contacts 38, contacts R4b (now shifted because of the prior energization of relay R4), a pair of contacts R31a, down through wire 140, contacts R34a (in normal position), contacts R25a (in normal position), contacts R22a (in normal position) to the grid of tube T3, thus short circuiting the related bias resistor 138 and causing the tube to become conductive. The plate of this tube is connected to the escape magnet 44 whose other side is connected through wire 141 to cam contacts P1 and thence to line 132.

Escape magnet 44 will operate to advance the card one step, to bring its first punched column beneath the row of sensing blades 13, and upon energization magnet 44 will also close its related contacts 46, which short circuit the bias resistor 138 of tube T1, so that it becomes conductive to energize relay R22, through wire 141 and the cam contacts P1. This relay will thereupon open its contacts R22a in the grid circuit of tube T3, causing deenergization of the escape magnet 44 before the card has advanced more than a single column or step.

Relay R22 also closes its contacts R22b (Fig. 17a), completing a circuit from line 133, through contacts R22b and wire 142 to the grid of tube T7, rendering it conductive so that the read clutch magnet 83 in the plate circuit thereof will be energized through wire 141 and contacts P1. This will result in tripping of the one-revolution clutch causing shaft 75 of Fig. 3 to make a single revolution during which the bails 20, 20a are oscillated.

As explained in the mechanical description, and in accordance with the example wherein a 4 perforation is present in column 1, the 4 blade 13 will rise through such perforation, and the 4 finger 23 will also rise, with the finger and related slide 16 maintaining their normal relationship. In all other positions, the blades 13 are blocked against upward movement by the imperforate portion of the card, and the related fingers 23 will also remain in their lower or home position, so that in no position will there be a rocked finger 23, and as a result the contact bail 32 remains undisturbed and the contacts 34, 35 remain in normal position.

During this revolution of shaft 75, the contacts controlled by the cams prefixed P make one revolution in accordance with the timing shown in Fig. 16, from which it will be noted that immediately upon commencement of the revolution contacts P1 open to break the holding circuit for relay R22, the escape magnet 44, and the read clutch magnet 83.

When the interposer contacts 38 closed, a further circuit was completed from line 133, through contacts 38 (Fig. 17a), contacts R4b (shifted), contacts R31a, contacts R25c, to the grid of tube T2, rendering it conductive and through its plate circuit causing energization of the keyboard restore magnet 64, to thereby restore the tripped slide 59 to its initial position and permit opening of the contacts 63 through their own resiliency for the test period as indicated in Fig. 16, and in Fig. 17b the closure of contacts P5 as an incident to the operation of shaft 75 will complete a circuit from line 133, contacts P5, contacts R5a in normal position, normally closed verifier contacts 35 to relay R4, which will establish its hold circuit through contacts P4 as before. It may be mentioned that prior to the closure of contacts P5, contacts P4 open to drop out the holding circuit for relay R4, and that thereafter this relay is picked up again automatically through contacts P5, so that at this point in the operation column 2 is in readiness to be advanced for checking but waits one step away from the reading position.

From Fig. 15 is is noted that this column 2 contains a perforation in the 8 position and, if the operator now depresses the 8 key 53, the same sequence of operations is repeated, that is, escape magnet 44 is energized to advance column 2 into reading position, and then the read clutch magnet 83 is energized to effect a comparison between the hole arrangement in column 2 and the key setting. If there is coincidence, relay R4 is reenergized through contacts P5 and 35, and conditions are set up for the next step.

Assume now that for column 3, in which there is a 6 perforation, the operator has pressed a different key 53. As a result of this, the procedure will follow in the same manner as though a correct key had been depressed with the exception that, when bail 20 now rocks, two of the fingers 23 will rock and actuate the verify bail 32 to shift contacts 34 and 35. As a result, when contacts P5 (Fig. 17b) close during the reading cycle, the circuit will not be reestablished to relay R4 and instead there will be a circuit traceable from line 133, contacts P5, contacts R5a, the contacts 34 (now closed), contacts R34b to pickup winding P of relay R31, and to line 132. Relay R31 is identified as the "first error relay." It will close its contacts R31h to complete a holding circuit through its P winding and contacts R34h, which will thus hold until relay R34 becomes energized after a period of automatic delay.

Relay R31 shifts a pair of contacts R31c in Fig. 17a to connect the grid of tube T17, which is normally connected to the bias resistor 138 and biased at —49 volts to the +130 volt source, through a 220,000 ohm resistor 143. The potential of the grid of tube T17 will raise slowly to about +10 volts because the condenser 144 across resistor 138 has to charge up through the high resistor 143. At the end of approximately 2 seconds, the tube T17 conducts and relay R34 will be energized through the plate circuit to open its contacts R34h (Fig. 17b) and deenergize relay R31. Relay R34 closes its contacts R34e (Fig. 17b) to provide a holding circuit through contacts P7, so that relay R34 will remain energized until the next read cycle takes place.

Reviewing briefly, depression of the key will first cause energization of escape magnet 44 to advance the card, energization of relay R22 and energization of read clutch magnet 83. The keyboard restore magnet 64 will also be energized to restore the key and, if during the ensuing test period an "error" is detected, relay R31 is energized and will be held until relay R34 becomes energized after the delay period.

In Fig. 17b relay R31 closes a pair of contacts R31e, completing a circuit from line 133, contacts P4, contacts R22c, R31e, and the lamp 144 to line 132. A parallel circuit also extends from R31e, through contacts R34d, to an audible buzzer represented by a magnet 145 to line 132. It is thus seen that, immediately upon occurrence of an error indicated by energization of relay R31, lamp 144 is lighted and buzzer 145 is sounded. After the delay period, relay R34 will be energized as explained to open its contacts R34d to disconnect the buzzer without, however, disturbing the circuit through the lamp 144. It closes contacts R34g to shunt contacts R31e (which now open) and thereby maintain the lamp circuit.

The operator thus receives a short audible signal and a continued visible one to indicate that an error or rather a disagreement has occurred in the column tested. At this point the operator is given a second opportunity to check the same column, in the event that the perforation is correctly located in the card but that the wrong key was depressed. Since the column in question is now at the reading blades, the preliminary space operation must be omitted. This is brought about as follows.

The operator now depresses another key, resulting in the closure of the interposer contacts 38, through contacts R4b (in their unoperated position), and through wire 142 directly to the grid of tube T7 to energize the read clutch magnet 83, and the shaft 75 goes through a cycle of operations without the preceding escapement action.

The contacts R34a which are now shifted will cause the circuit to branch upwardly from wire 142, through wire 149, contacts R25a to the grid of tube T2 to energize the keyboard restore magnet 64 for normal restoration of the operated key.

If on this second attempt the key depressed corresponds to the hole position, the verify contacts 34, 35 remain in their normal position and, when contacts P5 close during the read cycle, relay R4 will be reenergized. From this point the operations continue as though the operator had pressed the correct key in the first instance.

If upon a second try a wrong key is again operated, the verify contacts 34, 35 will be in shifted position when contacts P5 close, and relay R34 which is held energized by contacts P7 (see Fig. 16) through this period will direct a circuit from line 133, through contacts P5, contacts R5a, contacts 34 now closed, contacts R34b (shifted) to the pickup winding of relay R37 and line 132. From the time chart (Fig. 16), it is seen that contacts P7 are closed during the period that contacts P5 close and, therefore, hold relay R34 energized after contacts P4 have opened to drop out the other relays that are held through such contacts.

Relay R37 will close its contacts R37a (Fig. 17b) to provide a hold circuit through reclosed contacts P4 and will also close a pair of contacts R37b to energize relay R5, which through its contacts R5b will hold through contacts P7. The notch control magnet 111 is wired in parallel with relay R5, so that it is energized concurrently therewith and will now free the notching mechanism for operation on the next operation of the shaft 75. Such operation is now brought about as follows.

Relay R5 closes a pair of contacts R5c (Fig. 17a) which complete a circuit directly from line 133, contacts R5c, wire 142, to the grid of tube T7, resulting in energization of the read clutch magnet 83, so that shaft 75 now makes a revolution, and rod 89 (Figs. 4 and 5) will be drawn downwardly to operate punch 90 to notch the upper edge of the card 10 in the column in which the error was located. As an incident to the operation of the notching device, contacts 119 (Fig. 17b) open and become latched in such position for the purpose to be explained in connection with the last column reading operation, and will remain closed until manually opened after the card has passed through the machine.

During this notching cycle, contacts P7 open to deenergize relay R5 and contacts P4 open to deenergize realy R37 and magnet 111, and at the completion thereof the circuit conditions are the same as at the commencement of operations with the exception that contacts 119 are latched open.

The operations as thus far explained will continue throughout the remainder of the card, that is, the numeric keys may be operated or the spaced key 53S may also be operated to close contacts 63 (Fig. 17b), any one of which keys will close the interposer contacts 38 and effect a space operation followed by a reading cycle. It is apparent that, when the space key is operated, if there is a hole present in the column, there will be non-conformity between one of the slides 16 and one of the fingers 23, and an error will be denoted.

Ultimately, the card arrives in the last column position, that is, the position in which the 80th column has been advanced to the reading blades and the perforations in that column verified. With the card in this last column position, a pair of so-called last column contacts 145 are closed by a well known card lever or similar device (not shown), and a circuit is completed from line 133, contacts P4 (Fig. 17b), contacts R22c in normal position, contacts 145, the notching latch contacts 119 and last column notch solenoid 100 to line 132. This circuit is only completed if contacts 119 have not been opened and latched open as a result of an error during the verifying operations.

If there is no error, solenoid 100 is energized as explained and will bring about an additional cycle for the purpose of effecting a notch 93 in the right hand edge of the card. As explained in the mechanical description, solenoid 100 shifts the interposer plate so that operation of link 89 will cause operation of punch 91 instead of punch 90. The solenoid 100 closes its related contacts 100a, completing a circuit from contacts P4 (Fig. 17b) to the notch control relay 111 and in parallel therewith relay R5. These, as explained before, will energize the read clutch magnet 83 directly through contacts R5c, so that during the ensuing cycle the parts are operated to punch the notch 93.

In Fig. 17a, relay R5 when energized, closes contacts R5d to energize the keyboard restore magnet 64, so that during the extra cycles calling for the notching operations the magnet 64 will hold any latch 57 (Fig. 7) from being reclosed. During such extra cycles the verifying bails 20, 20a operate and slides 16 may rise and, as a result, the verifying contacts 34, 35 may shift. To negative the effect of this, a pair of contacts R5a (Fig. 17b) shifts to open the circuit from contacts P5 to the verify contacts 34, 35 and connect P5 to the relay R4 directly.

If the operator "overkeys" upon occurrence of an error, that is, operates another key or keys beyond the one which caused the error indication, the delay device provides for rendering such overkeying ineffective, provided it occurs within the delay period.

The first key operated after an "error" will be ineffective but will be locked down and as a result will prevent depression of any further keys so that, if the operator "runs over" the column in error by more than one key of operation, the locked key will serve as an indication of the place in error.

Assuming that this occurs, the relay R31 will have been energized before such additional key can become effective, so that the condition is one where the extra key operation occurs while relay R31 is in energized condition. Relay R31 opens a pair of contacts R31g (Fig. 17b) to prevent completion of any circuits to interposer magnets 30 by the extra key operation, and the contacts P6 in series therewith also prevent such circuits during the first half of any read cycle.

Since magnets 30 cannot be energized, the interposer contacts 38 will not be closed and no circuit can be completed to the restore magnet 64. From the mechanical explanation, it is seen, therefore, that the first "extra" key will be locked down and no further extra keys can be depressed because of the disk interlock between adjacent keyboard latches.

At the end of the delay period, relay R34 becomes energized as explained and breaks the holding circuit for relay R31. Contacts P6 will have reclosed so that with the extra key depressed and contacts R31g (Fig. 17g) reclosed, the interposer magnets 30 could receive current. This is prevented by the provision of a circuit in Fig. 17a extending from line 133, through common contacts 150 (closed if a key is in operated position), contacts R31f to the grid of tube T9 to energize the holding winding H of relay R31. Thus, even though relay R34 is energized and breaks one holding circuit of relay R31, this additional hold circuit will maintain the relay R31 in energized condition.

Also, upon energization of relay R34 there is a circuit from line 133, through contacts 150, contacts R34f and wire 151 to grid of tube T2 to energize the keyboard restore magnet, resulting in reopening of contacts 150 and any closed contacts 63. Contacts 63 and 150 open substantially concurrently and, with a slight delay in full deenergization of relay R31, its contacts R31g (Fig. 17b) will not reclose until contacts 63 are fully reopened, and any inadvertent energization of magnets 30 is avoided. In Fig. 17b, closure of contacts R34g will keep lamp 144 lighted until the next following read cycle when contacts P4 open. When contacts P4 again close during this following read cycle (see Fig. 16), the lamp 144 will tend to be lighted again momentarily, but contacts P7 open virtually immediately to deenergize the holding circuit of relay R34, thus opening contacts R34g and maintaining lamp 144 deenergized.

*Field skipping*

For the purpose of incorporating the feature of field skipping, there is provided the program card 10P of Fig. 14 which has its columns advanced to pass a contact station as corresponding columns in card 10 are one step away from the related reading station, as explained. In fields which are to be skipped upon detection of an error in any column thereof, there is provided a hole in the 11 position for all columns of the field except the first. Thus, for example, where a field designated A of card 10 is to be field skipped, the corresponding field AP of card 10P has perforations in all columns of the 11 positions except the first or column 34.

Now, when column 34 of card 10 is one column away from reading blades 13, the unperforated column 34 of card 10P will be at the sensing wheel 121. Upon operation of a verify key, the two cards move together, column 34 of card A escaping into reading position, where it is read as explained hereinabove. If perforations are correct, the operator may proceed to verify the next column. Upon detection of an error which, as explained, results in delay and opportunity for a repeat operation, and if upon such repeat operation the error persists, the notch control solenoid or magnet 111 is energized along with relay R5, which causes the additional notching cycle of shaft 75. The magnet 111 will cause closure of notching contact 148 (Fig. 5) as explained, which will complete a circuit from line 133 to the grid of tube T4 to energize skip relay R25, which will close its contacts R25b and hold through the program contacts 147, the circuit extending from line 133 to the contacts 147, contacts R25b to the grid of tube T4.

Relay R25 will also shift its contacts R25a to pick up the escapement magnet 44, this circuit extending from contacts R25b, through contacts R25a (now shifted), contacts R22a to the grid of tube T3. The contacts 147 remain closed across the series of 11 holes, so that the escape magnet 44 remains continuously energized until the next column, in which no 11 hole is present, arrives in the reading position, at which point contacts 147 are opened and magnet 44 deenergized to interrupt the card after the field containing the error has been spaced or skipped.

From this point on, verifying may be continued as before and, if a subsequent error is detected in another field for which there is 11-hole punching in card 10P, the column in error will be automatically notched and the remainder of the field skipped.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record card verifying machine, means for reading a column of a record card for perforations in index point positions therein, a plurality of keys, one for each index point position, a set of normally aligned reading elements, one for each position, means controlled by said reading means to cause an element or elements related to a perforated position or positions to move out of alignment, a set of normally aligned key elements, one for each key, each in engagement with a related reading element, and said key elements and said reading elements being movable along parallel paths, means controlled by the keys to cause a key element or elements related to an operated key or keys to move out of alignment, and indicating means jointly controlled by said reading elements and said key elements, for indicating a movement of an element of either set out of alignment without accompanying coextensive parallel movement in the same direction of the corresponding element in the other set.

2. The invention set forth in claim 1 in which the elements of each pair of engaging elements comprising a reading element and a corresponding key element are configured at their areas of engagement to effect movement of one in a direction transverse to the movement of the other, when either moves out of alignment without accompanying coextensive parallel movement of the other in the same direction.

3. In a verifying machine, a row of aligned reading elements, a row of aligned key elements, arranged in parallel juxtaposition, with each key element opposite a reading element, record controlled means for shifting a reading element out of alignment in its row, key controlled means for shifting a key element out of alignment in its row, control means for causing both shifting actions to be effected concurrently and to the same extent to maintain the relative positions of opposed reading and sensing elements, cam means on the elements of one row, means controlled thereby upon shifting of an element in either row without concurrent shifting of the related element in the other row, for causing movement of an element in a direction transverse to the direction of shifting, and indicating means controlled by the transversely moved element.

4. In a verifying machine, a slide, a finger spring-pressed thereagainst, said slide having a projection thereon to hold the finger a predetermined distance from the slide, means for shifting the slide and the finger concurrently and to the same extent, so that the slide and finger maintain their point of contact, record controlled means for determining whether the slide is to shift, key controlled means for determining whether the finger is to shift, whereby either the slide or finger or both may shift with said shifting means, said projection being effective when either the slide or the finger shifts without accompanying shifting of the other, for enabling the finger to move toward the slide, and indicating means actuated by the finger upon such movement.

5. In a verifying machine, record card advancing means, an escapement mechanism therefor, said card having columns of designation receiving positions, a plurality of keys, record sensing means, means effective upon operation of a key for causing said escapement mechanism to advance the card to present a column to the sensing means, further means jointly controlled by the key and said sensing means for comparing the key with the designation in the column presented and means controlled by the comparing means upon a disagreement, for rendering further key operation ineffective for a predetermined time interval.

6. The invention set forth in claim 5 in which key locking means is provided and rendered effective by said comparing means to lock the next following key in operated position, if such key is operated during said predetermined time interval.

7. In a verifying machine having card advancing means, sensing means, keys, comparing means jointly controlled by said sensing means and keys to effect a comparison between a key operated and data sensed, in combination with control devices rendered effective upon each key operation to cause said advancing means to first advance the card to present a column thereof to the sensing means, and then render the comparing means effective, means controlled by the comparing means upon disagreement, for preventing the operation of the advancing means for the next key operation, to render only the comparing means effective for said next key, whereby the same column will be reverified.

8. In a machine dealing with record cards having columns of data designating positions, the combination of means for verifying the data designations and including a row of data sensing elements and keys for selectively cooperating with said elements to verify the designations, record advancing means, escapement mechanism therefor, operation of a key causing operation of said escapement mechanism to present a card column to said sensing elements, means jointly controlled by said keys and elements and effective when a key depressed disagrees with the designations in the column advanced and sensed, for preventing operation of the escapement mechanism by the next key depressed, means controlled jointly by said keys and elements and effective when a second key is depressed, following depression of a non-agreeing key, and said second key agrees with the designations in the columns sensed for disabling said preventing means, whereby the third key depressed will cause operation of the escapement mechanism to present a second column to the sensing elements.

9. In a machine dealing with record cards having columns of data designating positions, the combination of means for verifying the data designations and including a row of data sensing elements and keys for selectively cooperating with said elements to verify the designations, record advancing means, escapement mechanism therefor, operation of a key causing operation of said escapement mechanism to present a card column to said sensing elements, means jointly controlled by said keys and elements and effective when a key depressed disagrees with the designations in the column advanced and sensed for preventing operation of the escapement mechanism by the next key depressed, means controlled jointly by said keys and elements and effective when a second key is depressed, following depression of a non-agreeing key and said second key also disagrees with the designations in the column sensed, for marking the column sensed, and further means jointly controlled by said keys and elements for disabling said preventing means, whereby the third key depressed will cause operation of the escapement mechanism to present a second column to the sensing elements.

10. In a machine dealing with record cards having columns of data designating positions, the combination of means for verifying the data designations and including a row of data sensing elements and keys for selectively cooperating with said elements to verify the designations, record advancing means, escapement mechanism therefor, operation of a key causing operation of said escapement mechanism to present a card column to said sensing elements, means jointly controlled by said keys and elements and effective when a key depressed disagrees with the designations in the column advanced and sensed for preventing operation of the escapement mechanism by the next key depressed, further means controlled thereby for providing a continuous visible signal and an audible signal for a predetermined time interval, means controlled jointly by said keys and elements and effective when a second key is depressed, following depression of a non-agreeing key, and said second key agrees with the designations in the columns sensed for disabling said preventing means, and further means controlled thereby for disabling said signal.

11. In a machine of the class described, in combination, means for analyzing the designations in the columns of a record card, associated key operated means for verifying the analyzed designations column by column, a first punch, and controlling means for actuating said punch to make a notch in the margin of a non-verified column, a second punch, and controlling means for actuating said second punch to make a notch in an adjacent margin upon verification of all the columns analyzed, and interlocking means for rendering said last named controlling means ineffective as an incident to the operation of said first punch in a non-verified column.

12. In a verifying machine, means for sensing designations in index point positions of a column of a record card, means for moving the card past said sensing means column by column, a series of keys, one for each index point position, means jointly controlled by said sensing means and said keys for verifying the designations in the columns, a presettable control device, means operated by said verifying means upon non-verification of a column for initiating a skipping operation of said card moving means, and means controlled by said presettable control device for continuing said last named operation and terminating the same at a predetermined subsequent columnar position of the card.

13. In a verifying machine, means for sensing designations in index point positions of each of a plurality of successive columns of a record card, constituting a field, means for moving the card past said sensing means column by column, means jointly controlled by said sensing means and said keys for verifying the designations in the columns of the field, a control card, movable with the record card, and means jointly controlled by said verifying means and said control card upon non-verification of any card column in said field for causing said moving means to advance the remaining columns past the sensing means and for causing suppression of the sensing of such columns.

14. The invention set forth in claim 13 in which further means is controlled by said verifying means and effective upon non-verification, for making a mark in the column of the field in which the non-verification occurred.

ELLIOTT W. GARDINOR.
RAYMOND E. CHENEY.
LORIN T. BLEUER.

REFERENCES CITED

The following references are of record in the file of this patent:

UNITED STATES PATENTS

| Number | Name | Date |
|---|---|---|
| 2,013,534 | Campbell | Sept. 3, 1935 |
| 2,055,186 | Thomas | Sept. 22, 1936 |
| 2,078,084 | Lasker | Apr. 20, 1937 |
| 2,315,741 | Shafer | Apr. 6, 1943 |
| 2,528,438 | Keen | Oct. 31, 1950 |